May 2, 1933. H. E. TWOMLEY 1,906,288
CONVEYER
Filed Feb. 2, 1932 5 Sheets-Sheet 1
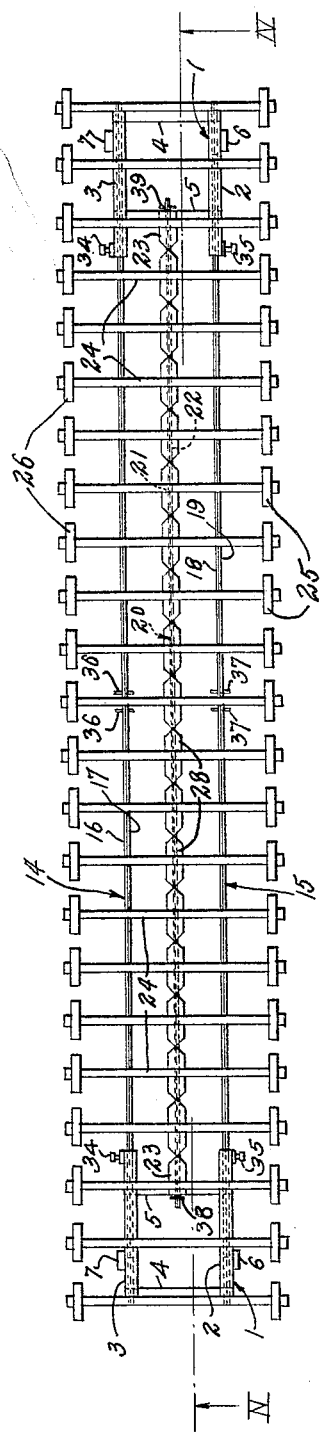
INVENTOR.
Herbert E. Twomley
BY
Lyon & Lyon ATTORNEYS.

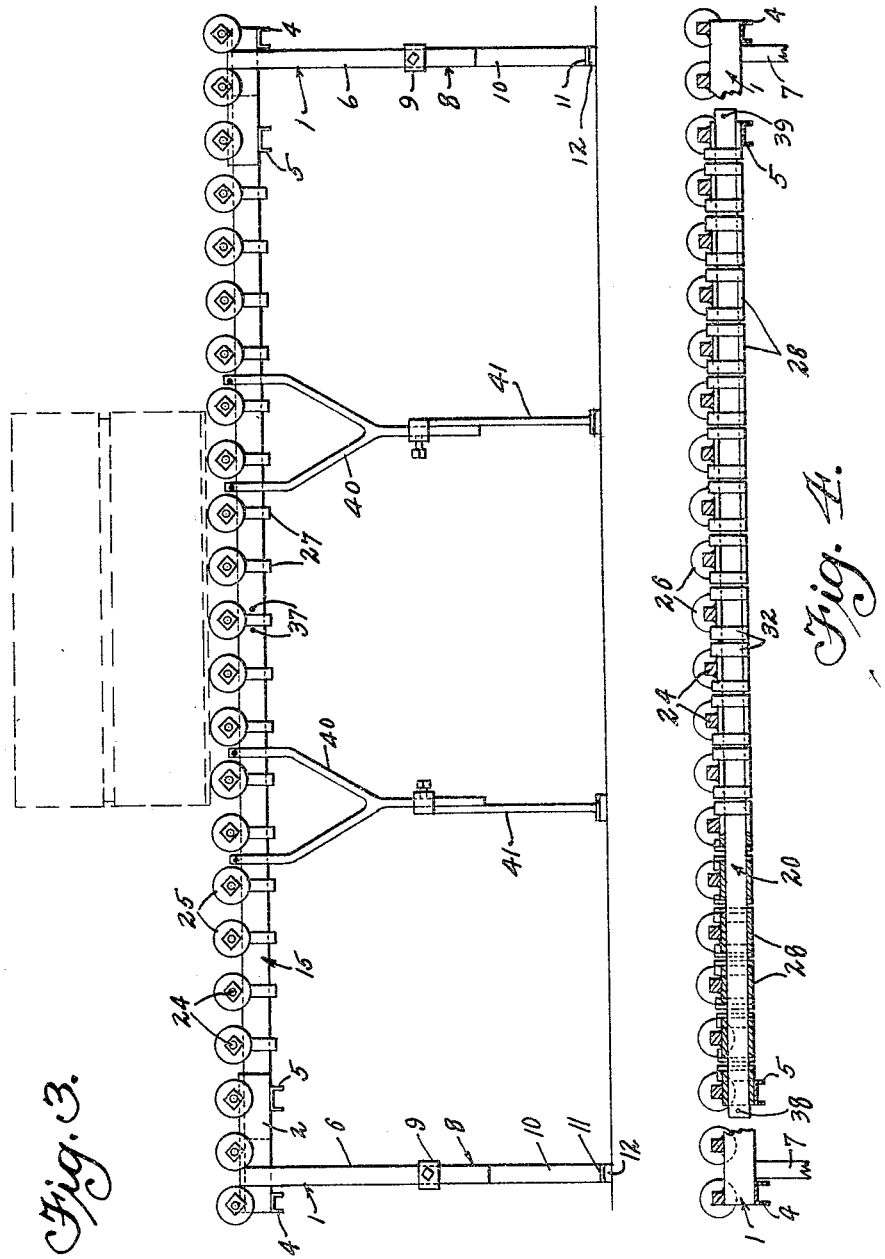

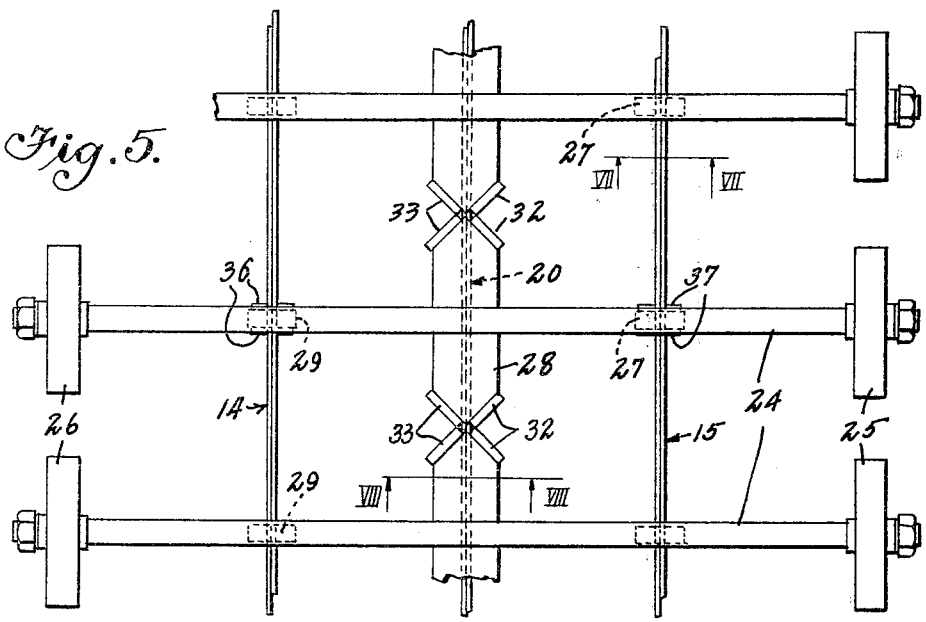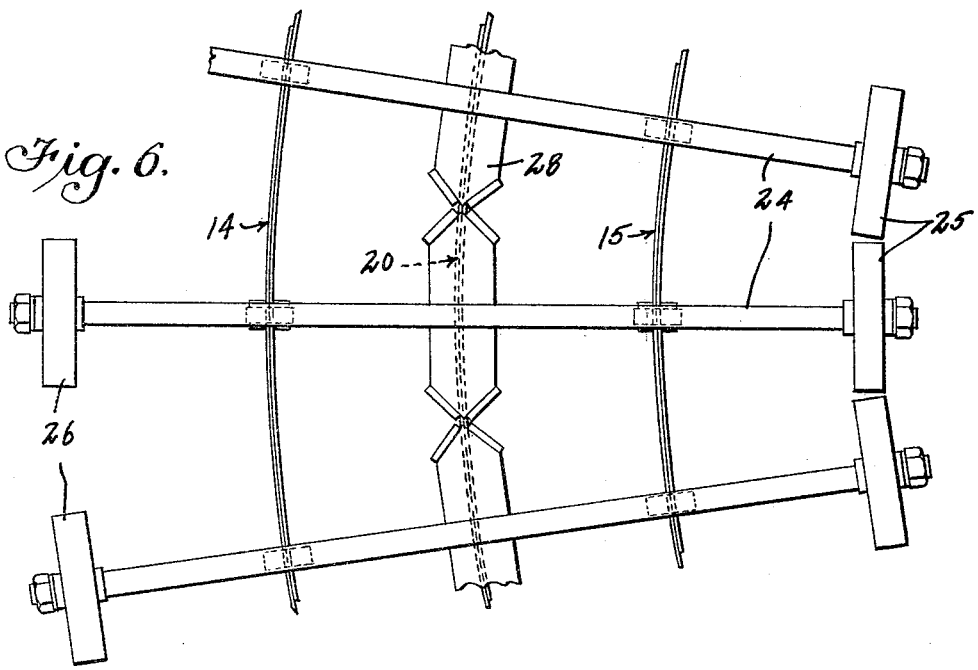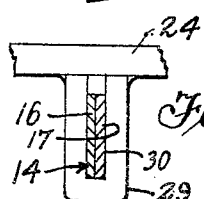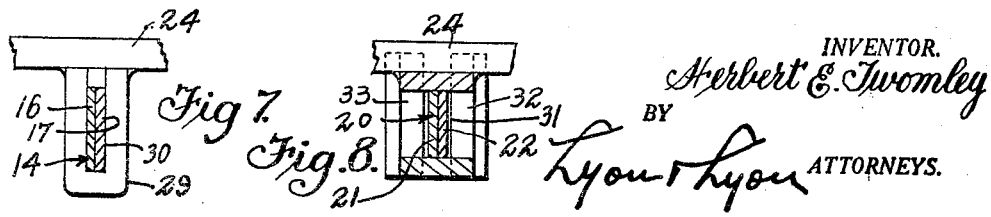

May 2, 1933.  H. E. TWOMLEY  1,906,288
CONVEYER
Filed Feb. 2, 1932     5 Sheets-Sheet 4
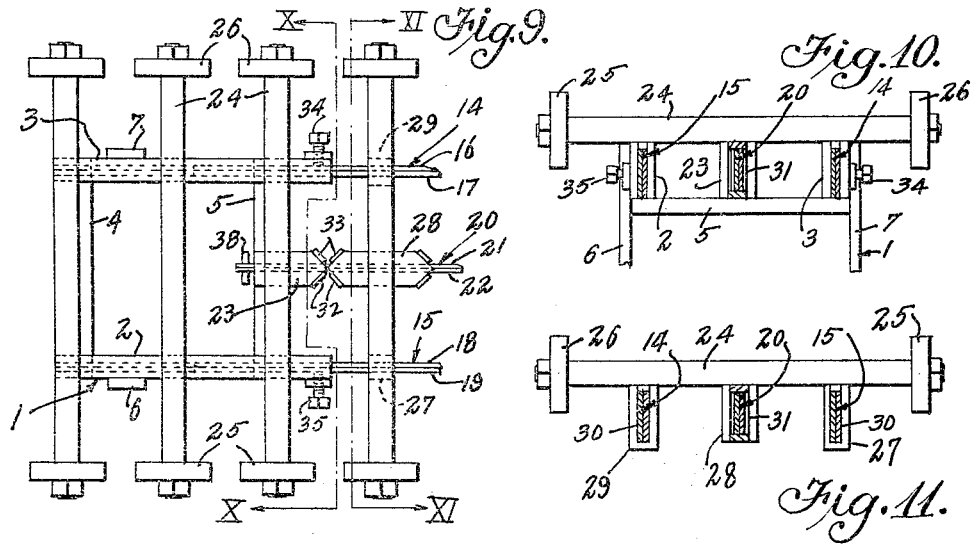
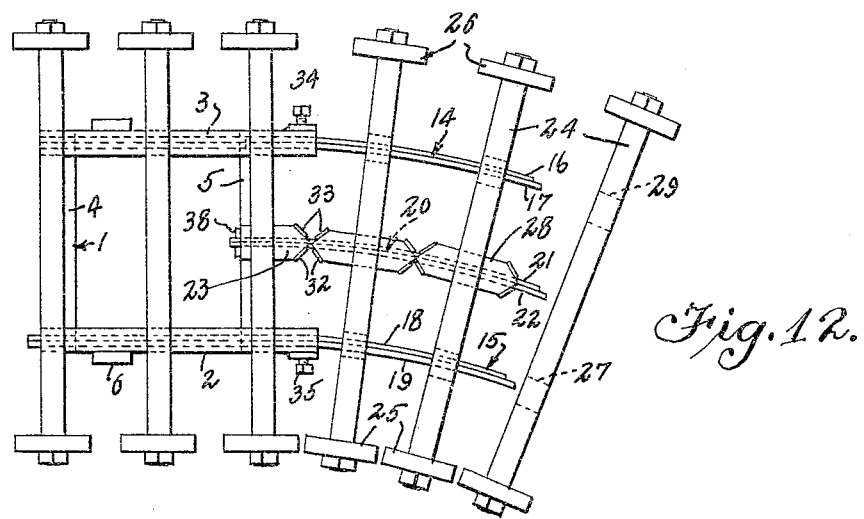
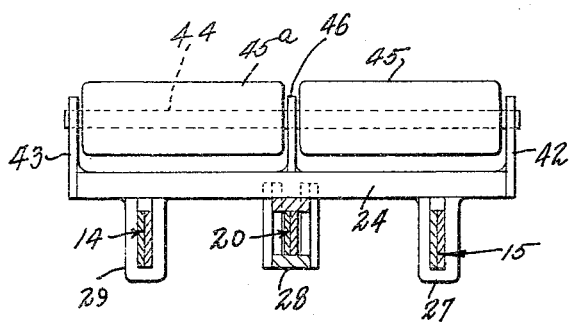
INVENTOR.
Herbert E. Twomley
BY
Lyon & Lyon ATTORNEYS.

INVENTOR.
Herbert E. Twomley
BY
Lyon & Lyon ATTORNEYS.

Patented May 2, 1933

1,906,288

UNITED STATES PATENT OFFICE

HERBERT E. TWOMLEY, OF RIVERSIDE, CALIFORNIA, ASSIGNOR TO CLARA B. PARKER, OF RIVERSIDE, CALIFORNIA, EXECUTRIX OF THE ESTATE OF GEORGE D. PARKER, DECEASED

CONVEYER

Application filed February 2, 1932. Serial No. 590,456.

My invention relates to conveyers, and has particular reference to a conveyer which may be readily adjusted to assume various angles and curves.

In conveyer systems for transporting boxes, packages and devices from one portion of a building to another, and for loading and unloading material to and from cars, etc., it frequently occurs that the rigid conveyer systems are not adapted to a particular work, since it becomes necessary to direct packages and parcels to portions of a building somewhat remote from such rigid conveyer structures. This is particularly true in loading and unloading cars which may not be "spotted" at the particular points most accessible to the conveyer system, and also in stacking parcels, etc., in warehouses where it is desirable that the parcels should be supplied to varying points as the floor of the warehouse becomes filled with previously stacked parcels.

Another object of the invention is to provide a conveyer which is readily adjustable to various curves and angles to permit movement of the conveyer to the particular point desired.

Another object of the invention is to provide a conveyer which is flexible to permit changing of the direction of the conveyer, but which is rigid in a vertical direction to insure complete support for parcels which may pass thereover.

Another object of the invention is to provide a conveyer which is capable of being moved to various angles and curves in which the rollers upon which the parcels ride automatically assume correct angles in accordance with the direction in which the conveyer is angled or curved.

Another object of the invention is to provide a flexible conveyer which may be moved to various angles and curves in which the rollers which support the parcels automatically align themselves with radii of a common circle of which the curvature of the conveyer constitutes the circumference.

Another object of the invention is to provide a flexible conveyer which may be moved to various angles and curves and which may be locked in the curved position to maintain the same in the desired angles and curves.

Another object of the invention is to provide a flexible conveyer movable to various angles and curves in which the rollers upon which the parcels rest change their axes to alignment with radii of the circle of which the center of the conveyer constitutes the circumference.

Other objects and advantages will be apparent from a study of the following specifications, read in connection with the accompanying drawings, wherein, Figure 1 is a top plan view of the conveyer embodying my invention;

Figure 2 is a top plan view of the conveyer shown in Figure 1, curved in accordance with my invention.

Figure 3 is a side elevational view of the conveyer shown in Figure 1.

Figure 4 is a sectional view, taken along line IV—IV of Figure 1.

Figure 5 is an enlarged detail plan view of the conveyer shown in Figure 1.

Figure 6 is an enlarged detail view, similar to Figure 5, but illustrating the conveyer in curved position.

Figure 7 is a sectional view, taken along line VII—VII of Figure 5.

Figure 8 is a sectional view taken along line VIII—VIII of Figure 5.

Figure 9 is a detail top plan view of one end of the conveyer shown in Figure 1.

Figure 10 is a sectional view, taken along line X—X of Figure 9.

Figure 11 is a sectional view, taken along line XI—XI of Figure 9.

Figure 12 is a view similar to Figure 9, showing the conveyer in curved position.

Figure 13 is a detail view, showing a modified form of roller which may be employed with my invention.

Figure 14:
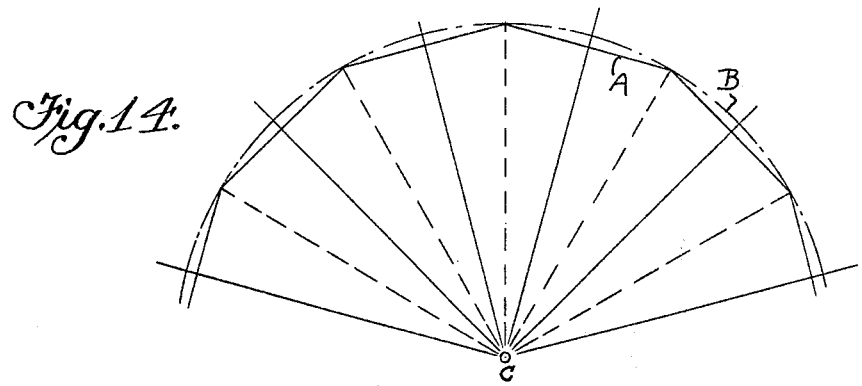
Figure 14 is a diagrammatic view illustrating the axes of the rollers of the conveyer, constructed in accordance with my invention.

Referring to the drawings, I have illustrated a conveyer as comprising a rigid end frame 1 consisting of a pair of spaced parallel slideways 2 and 3 rigidly connected together by means of cross bars 4 and 5. Each of the slideways is constructed to form an elongated substantially rectangular cross sectional passage extending in the longitudinal direction of the slideways, the passage being open at both of its ends.

The end frame construction is illustrated as being supported upon a pair of legs 6 and 7 secured thereto and extending vertically to be received in telescopic relation with a foot frame 8 as by means of passing the lower ends of the legs 6 and 7 through slide collars 9 rigidly attached to the upper end of upstanding legs 10 on the foot frame 8.

The foot frame 8 is illustrated as having a base 11 preferably formed of a flat bar of suitable material curved upwardly at its ends, as is illustrated at 12 with a cross bar 13 connecting the upper ends of the legs 10 to insure bracing and rigidity of construction. The upward curvature of the end 12 of the base 11 permits ready sliding of the end frame to align the conveyer to any desired position, as will be more fully described hereinafter.

One of the end frames 1 is provided at each end of my conveyer unit and the two end frames employed may be of identical construction. A pair of joists 14 and 15 are illustrated as extending between the end frames 1, the joist 14 being formed of a pair of spring ribbons 16 and 17 placed with their wide faces in contact with each other. The ribbons 16 and 17 are illustrated as being relatively thin but wide so that the pair of ribbons when held with their widths in the vertical direction constitutes a rigid structure in the vertical direction resisting deflection or deformation of the joists by vertical forces.

One end of each of the ribbons 16 and 17 extends into the passage formed in the slideway 3, which passage is preferably just sufficiently large to admit the ends of the ribbons so that when the ribbons are in place in the slideway the slideway holds the ribbons against twisting and constitutes a vertical support for the same.

The joist 15 is similarly constructed of a pair of spring ribbons 18 and 19, similarly associated with the slideway 2. With the construction thus far described, it will be apparent that the joists 14 and 15 are readily flexed in either of its lateral directions, but constitutes a rigid construction in the vertical direction, resisting vertical forces.

A central runner 20 is illustrated as extending in parallel relation with the joists 14 and 15, the central runner being formed, like the joists, of a pair of spring ribbons 21 and 22. One end of the runner 20 is illustrated as extending through a guide 23 rigidly secured to the cross bar 5 of the end frame 1, which guide has a central passage therethrough adapted to slideably receive the end of the runner.

A plurality of axles 24 are illustrated as extending laterally across the joists 14 and 15 to the central runner 20.

By referring particularly to Figure 12, it will be observed that the axle 24 has rotatably mounted upon its outer ends a pair of rollers 25 and 26 and has depending therefrom three lugs 27, 28 and 29, the lug 28 being illustrated as extending from the center of the axle 24, while the lugs 27 and 29 are illustrated as being placed upon the opposite sides of the central lug 28. The outer lugs 27 and 29 are each constructed with a rectangular cross sectional passageway 30 therethrough, the longitudinal axis of the passage 30 extending at right angles to the axis of the axle 24, and the passageway 30 constituting a sliding fit with the ribbons 16–17, forming the joists 14 and ribbons 18—19 forming the joists 15.

It will be observed from an inspection of Figure 11 that while the ribbons 16–17 and 18–19 are in the lugs 29 and 27, the lugs constitute a rigid support preventing twisting of the joists but permitting longitudinal sliding movement of the joists relative to the axle 24.

The central lug 28 is illustrated as being formed of a box-like structure having a rectangular passageway 31 therethrough to slideably receive the central runner members 21 and 22. It will be observed that the width of the passageway 31 is considerably in excess of the width of the pair of ribbons 21 and 22 so that these ribbons have some lateral movement in the passageway. However, by referring particularly to Figures 5 and 8, it will be observed that each end of the lug 28 is tapered toward the center and end plates 32 and 33 are secured to the tapered ends to constrict the passageway at its outer ends to a rectangular cross section substantially equal to the cross section of the runner 20. Thus, while lateral motion is permitted the central runner 20 within the box-like lug 28, a rigid support is provided at either end of the lug preventing any twisting action or any separation of the ribbons 21 and 22 which form the central runner.

By referring particularly to Figure 1, it will be observed that the assembly of the construction thus far described is that of threading the lugs 27 of each of the axles 24 upon the joist 15 and threading the central lugs 28 upon the runner 20 so that the outer ends of the lugs 28 in adjacent axles 24 just contact each other, the lugs 28 constituting spacer members which hold the axles in a predetermined spaced relation, and threading the lugs 29 upon the joist 14. Thus the spacing of the lugs 27 and 29 hold the ribbon joists 14 and 15 in spaced length throughout the length of the conveyer, and also the lugs 28 hold the central runner 20 in spaced parallel relation centrally located with reference to the joists 14 and 15.

It will therefore be observed that the mounting of the axles 24 upon the joists in no wise interferes with the bending of the joists and runner in any desired lateral direction or position, but the relatively great vertical width of the joists and runners held vertical by the lugs supports the axles in a horizontal position rigidly against relative vertical movement.

Figure 15:
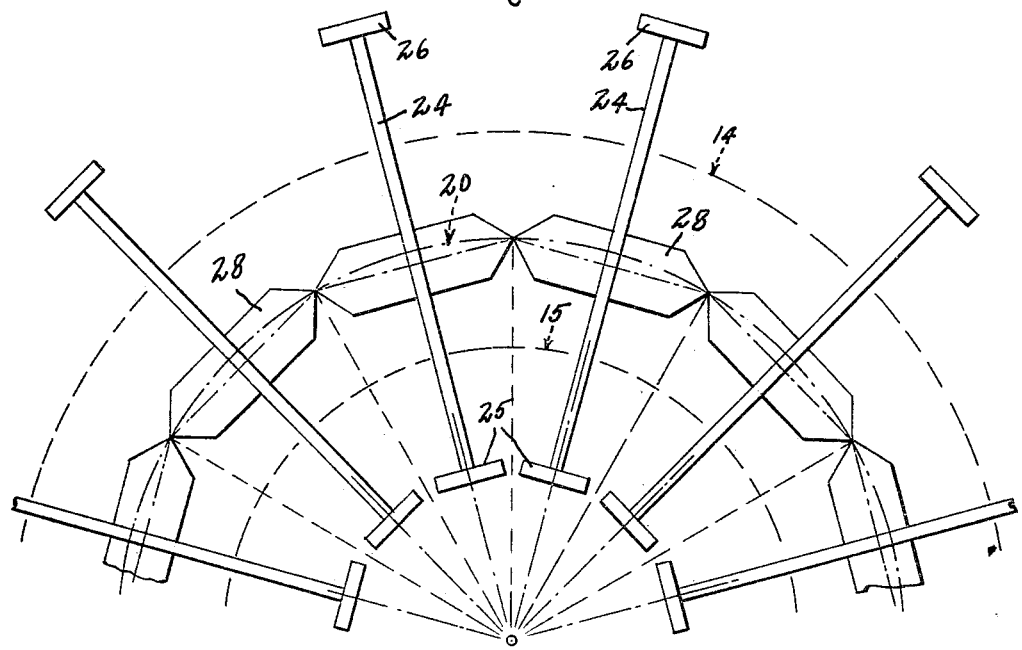
Figure 15 is a diagrammatic view, illustrating the manner in which the roller axes conform with the circle diagram shown in Figure 14.
Figure 16:
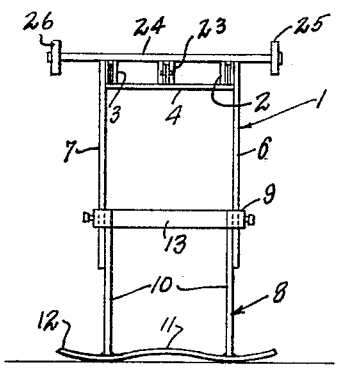
Figure 16 is an end view of the conveyer shown in Figure 1.

By referring particularly to Figures 6, 14 and 15, it will be observed that any lateral bending of the conveyer structure thus far described will, by reason of the spring ribbon construction of the joists and runner, cause the joists and runner to bend upon the arc of a circle.

The natural position of the spring ribbons is to hold them in a straight line, thus when any bending force is applied to the springs, their natural property is to assume the position of the arc of a circle. Thus, if the ends of one of the conveyers are brought toward each other, the central portion of the conveyer will bow out into the arc of a circle of which each section of the central runner 20 lying within each of the lugs 28 will form a small arc having a common center, as indicated at C in Figure 14.

It is a geometrical maxim that the bisector of any chord on the circle will pass through the center of the circle, and by referring to Figures 14 and 15, it will be observer that the longitudinal axis of each of the lugs 28 will constitute a chord A of the circle of which C is the center and B, (the section of the runner 20 which lies within the lug 28), constitutes an arc. Thus the axle 24, being mounted with its axis at right angles to the longitudinal axis of the lug 28, will have its axis extending along the proper bisector of the chord of the circle. Hence any bending of the conveyer structure to any curve will cause the axles 24 to each assume the position of bisectors of equal chords of the circle having a common center at the center of the bending of the conveyer. Thus when the conveyer is bent, each of the axles will be moved relative to its adjacent axle so that a true arcuate path is described by each of the rollers 25 and 26 and the arc described by all of the rollers 26 will have the same center as the arc described by the opposite rollers 25.

Thus a parcel or package which might be placed upon the rollers will traverse the conveyer around the curves or bends without any tendency for the parcel to diverge from the true arcuate path, as would occur if the axles were not arranged to assume the correct positions.

It will be observed that the bending of the conveyer automatically causes the correct alignment of the axles without the necessity of any manual adjustment of the axles.

It will be further observer that as the conveyer is moved or bent, the joists 14 and 15 will slide within the guide passages of the lugs 27 and 29 to readily permit the axles to assume their correct positions.

By referring to Figures 1, 2 and 9, it will be observed that the slideways 2 and 3 permit considerable lateral movement of the joists 14 and 15 relative to the slideways to permit elongation of the outermost joist on the arc to which the conveyer may be bent and to permit shortening of the joists on the inner side of the arc.

When the conveyer has been moved to the desired curvature, that is, when one end frame 1 of the conveyer is aligned with the position at which parcels are to enter the conveyer, and the other end frame 1 is aligned with the correct position for the outlet of the conveyer, the joists 14 and 15 may be located in place in their correct position by means of suitable set screws 34 and 35 secured to the slideways 2 and 3. Thus upon locking of the joist members, the conveyer is rigidly held in any position it may be moved.

By referring particularly to Figure 1, it will be observed that ribbons 16 and 17, constituting the joist 14, must be permitted to slide relative to each other to assume the various arcs to which the conveyer may be moved. Thus a pair of loosely fitted pins 36 are provided to pass through both of the ribbons 16 and 17 upon opposite sides of the central axle 24 of the conveyer unit. Hence the pins 36, loosely fitted into the ribbons 16 and 17, permit considerable relative movement between the two joist members. Similarly, the joist 15 may be secured by pins 37.

Since the central joist 20 lies upon the circumference of the circle formed by the bending of the conveyer unit relatively little movement will occur between the ribbons forming this member and for this reason pins 38 and 39 may be secured at the ends of the members 21 and 22 to interconnect these members, it being understood that the pins will make a loose fit between the members so as to permit slight movement between them. The pins 38 and 39 constitute the securing means which holds the axles 24 in position upon the conveyer unit and holds the entire conveyer unit assembled.

The construction thus far described constitutes a construction which is rigid in the vertical direction, but which may be readily distorted or curved in the lateral direction. Such construction, for example, with the joists formed of 16-gauge spring material of approximately 1½ to 2 inches in width, and ten or more feet in length, will be sufficiently rigid to support a relatively heavy parcel passing thereover. However, it may be desired to provide additional vertical support for the central portion of the conveyer, and for this purpose I have illustrated additional supporting legs 40 which may be applied intermediate the end frames 1. The legs 40 constitute a substantially Y-shaped construction, the upper arms of the Y slideably engaging the joists 14 or 15 with which it may be associated so that sliding movement of the legs 40 and the joists may occur.

The lower arm of the Y may be telescopically assembled upon a foot piece 41 similar in all respects to the foot frame 8, hereinbefore described.

By referring particularly to Figure 13, it will be observed that the rollers 25 and 26 on each of the axles 24, may be substituted for by a substantially continuous roller which traverses the entire lateral extent of the conveyer. The axle 24 is preferably provided with a pair of upstanding end legs 42 and 43 on each of its ends which in turn rotatably mount a shaft 44 upon which the rollers 45 may be mounted. Preferably, the rollers 45 are divided into two or more sections, illustrated as 45 and 45a, with an additional supporting bearing member 46 extending from the axle 24 to engage the central portion of the shaft 44. If desired, the rollers 45 and 45a may be constituted of a plurality of disc-like sections so that each of the sections may rotate relative to the remainder, thus adapting themselves to the movement of a parcel about the arcuate path without causing slippage between the surface of the rollers and the package resting thereon.

It will therefore be observed that I have provided a flexible conveyer unit which may be readily bent or curved, into any desired configuration and which when so bent causes its rollers to automatically assume the necessary position to make parcels thereon "track" around the curve.

It will be observed that the three axles 24 which constitute the end axles of the unit are rigidly supported upon the end frame 1 so that upon bending of the conveyer these axles do not assume the angular positions of the remainder of the axles, but remain in rigid straight alignment. The purpose of this is to provide a straight path for the entrance of parcels upon the conveyer to insure correct alignment of the parcels with the rollers of the conveyer assisting in guiding these parcels correctly into position upon the rollers which may have been moved to an arcuate path. Also, this rigid construction permits the correct alignment of the end 1 of the conveyer with a rigid conveyer from which parcels may be fed. Further, the conveyer unit may be readily joined to another conveyer unit of the same type by merely interconnecting the end frame 1 as by inserting therebetween short ribbons of joist material or short straps which hold the end frame of one conveyer rigid with respect to the end frame of the succeeding conveyer unit. Thus a plurality of the conveyer units may be built up into a long conveyer which may have any desired configuration of the conveyer path.

While I have shown and described the preferred embodiment of my invention, it is to be understood that I do not wish to be limited to any of the details of construction described herein, except as defined in the appended claims.

I claim:

1. In a conveyer unit, a flexible runner rigid in a vertical direction but flexible in a horizontal direction, a plurality of axles extending across said runner, a lug rigidly secured to each of said axles and having a passageway therethrough to receive said runner, said lug extending along said runner beyond the side edges of said axles, said passageway forming a right angle with the axis of said axle, and means for holding a plurality of said axles threaded upon said runner with the lugs of adjacent axles abutting each other.

2. In a conveyer unit, a pair of spaced parallel joists extending longitudinally of said conveyer, a plurality of axles extending crosswise of said joists, each of said joists being rigid in a vertical direction but flexible in a horizontal direction, a plurality of lugs depending from said axles and having passageways therethrough for slidably receiving said joists, a central runner comprising a joist rigid in a vertical direction and flexible in a horizontal direction, a box-like lug on each of said axles having a passageway therethrough of greater width than said runner, the end of said passageway being reduced to a width substantially equal to the width of said runner, said passageway extending at right angles to the axis of said axle, and said central runner being threaded through all of said box-like lugs to secure said axles in place with said lugs in abutment with each other.

3. In a conveyer unit, a pair of spaced parallel joists extending longitudinally of said conveyer, a plurality of axles extending crosswise of said joists, each of said joists being rigid in a vertical direction but flexible in a horizontal direction, a plurality of lugs depending from said axles and having passageways therethrough for slidably receiving said joists, a central runner comprising a joist rigid in a vertical direction and flexible in a horizontal direction, a box-like lug on each of said axles having a passageway therethrough extending at right angles to the axis of said axle, said central runner being threaded through all of said box-like lugs to secure said axles in place with said lugs in abutment with each other, the passageway in each of said box-like lugs being formed with the entrances thereto substantially of the same dimension as the cross-section of said central runner and the space between said entrances being wider than the thickness of said runner, whereby the runner within any of said lugs may assume the configuration of a small arc, the chord of which is formed by the longitudinal axis of said lug.

4. In a conveyer unit, a runner extending longitudinally of said conveyer, said runner comprising a pair of resilient ribbons, a plurality of axles extending across said runner, each of said axles having a box-like lug thereon with a passage therethrough extending at right angles to the axis of said axle for slidably receiving said runner therein, said passageway having entrance openings substantially equal to the cross sectional area of the assembled ribbons to hold said ribbons on edge.

5. In a conveyer unit, a pair of spaced parallel joists formed of material rigid in a vertical direction and flexible in a horizontal direction, a plurality of axles extending across said joists, a central runner formed of resilient material rigid in a vertical direction, means connecting said axles and said runner comprising a passageway extending at right angles to each of said axles through which said central runner may pass, lugs depending from said axles slidably engaging said joists whereby flexing of the said joists in a horizontal direction will cause said axles each to assume a position with its axis along the bisector of the chord formed by that portion of the runner lying within the passage of the lug thereon, and means for locking said joists in the position to which they are flexed to hold said structure in the new position.

Signed at Riverside, California this 8th day of January, 1932.

HERBERT E. TWOMLEY.